United States Patent
Pitu

(10) Patent No.: US 11,294,637 B2
(45) Date of Patent: Apr. 5, 2022

(54) METHOD AND APPARATUS FOR GENERATING TRUE RANDOM NUMBERS FOR AN INTEGRATED CIRCUIT

(71) Applicant: Siemens Aktiengesellschaft, Munich (DE)

(72) Inventor: Ciprian Leonard Pitu, Brasov (RO)

(73) Assignee: Siemens Aktiengesellschaft, Munich (DE)

( * ) Notice: Subject to any disclaimer, the term of this patent is extended or adjusted under 35 U.S.C. 154(b) by 184 days.

(21) Appl. No.: 16/462,036

(22) PCT Filed: Nov. 7, 2017

(86) PCT No.: PCT/EP2017/078446
§ 371 (c)(1),
(2) Date: May 17, 2019

(87) PCT Pub. No.: WO2018/091312
PCT Pub. Date: May 24, 2018

(65) Prior Publication Data
US 2019/0303105 A1    Oct. 3, 2019

(30) Foreign Application Priority Data
Nov. 18, 2016   (EP) .................................... 16464010

(51) Int. Cl.
*G06F 7/58* (2006.01)
(52) U.S. Cl.
CPC .............. *G06F 7/588* (2013.01); *G06F 7/584* (2013.01)
(58) Field of Classification Search
CPC ............. G06F 7/58; G06F 7/584; G06F 7/588

USPC ......................................................... 708/255
See application file for complete search history.

(56) References Cited

U.S. PATENT DOCUMENTS

| | | |
|---|---|---|
| 3,521,185 A | 7/1970 | Ley |
| 8,612,501 B2 | 12/2013 | Ergun |
| 2002/0131596 A1 | 9/2002 | Boeckeler |
| 2003/0037079 A1 | 2/2003 | Wilber |
| 2004/0260932 A1 | 12/2004 | Blangy et al. |
| 2010/0146025 A1 | 6/2010 | Ergun |
| 2016/0291936 A1* | 10/2016 | Margetts ................. G06F 7/588 |

FOREIGN PATENT DOCUMENTS

WO   WO2011/126587   10/2011

\* cited by examiner

*Primary Examiner* — Emily E Larocque
(74) *Attorney, Agent, or Firm* — Cozen O'Connor

(57) ABSTRACT

Apparatus and method for generating true random numbers for an integrated circuit, wherein the method includes providing a counter in an integrated circuit that counter receives a clock signal of the integrated circuit, sending the signal of a resistor-capacitor circuit that act as an oscillator to the counter, where the resistor-capacitor circuit is situated outside the integrated circuit and is connected to the integrated circuit via input/output pins, changing the signal of the resistor-capacitor circuit by randomly switching one or more additional resistors in parallel to the resistor of the resistor-capacitor circuit to change the frequency of the signal of the resistor-capacitor circuit and counting the oscillations of the clock during one oscillation of the signal of the resistor-capacitor circuit and filling a register with the resulting bit stream.

12 Claims, 2 Drawing Sheets

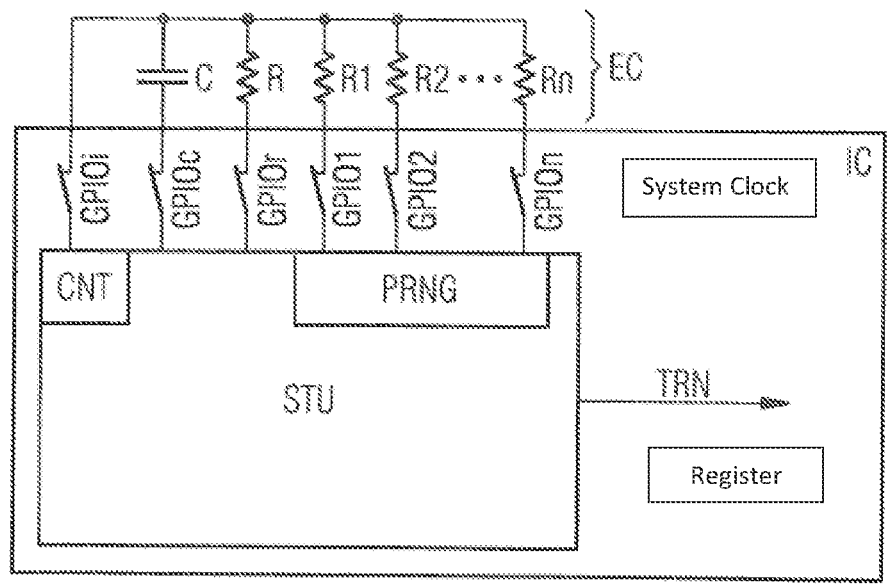
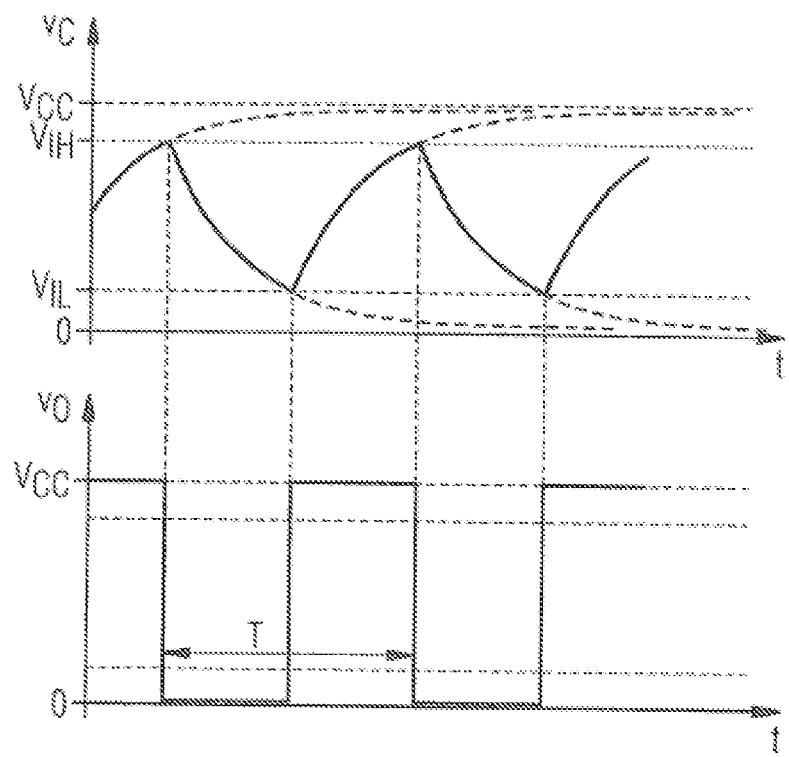

METHOD AND APPARATUS FOR GENERATING TRUE RANDOM NUMBERS FOR AN INTEGRATED CIRCUIT

CROSS-REFERENCE TO RELATED APPLICATIONS

This is a U.S. national stage of application No. PCT/EP2017/078446 filed Nov. 7, 2017. Priority is claimed on EP Application No. 16464010 filed Nov. 18, 2016, the content of which is incorporated herein by reference in its entirety.

BACKGROUND OF THE INVENTION

1. Field of the Invention

The present invention relates to an apparatus and method for generating true random numbers for an integrated circuit, where the method uses a computer system, i.e., an integrated circuit (IC).

2. Description of the Related Art

An IC contains a CPU and may also contain memory, peripheral interfaces, and other components of a computer. Such integrated devices are variously called microcontrollers or systems on a chip (SoC).

A system on chip (SoC) is an integrated circuit (IC) that integrates all components of a computer or other electronic system into a single chip. An SoC may contain digital, analog, mixed-signal, and often radio-frequency functions, all on a single chip substrate. A typical application of SoCs is in the area of embedded systems. An embedded system is a computer system with a dedicated function within a larger mechanical or electrical system, often with real-time computing constraints.

SoCs can be implemented as an application-specific integrated circuit (ASIC) or using a field-programmable gate array (FPGA). A field-programmable gate array (FPGA) is an integrated circuit designed to be configured by a customer or a designer after manufacturing. The FPGA configuration is generally specified using a hardware description language (HDL), similar to that used for an application-specific integrated circuit (ASIC).

It is necessary to prevent side channel attacks on the IC. Especially in cryptography, power analysis is a form of side channel attack (SCA) in which the attacker studies the power consumption of a cryptographic hardware device (such as an integrated circuit, especially the CPU core). The attack can non-invasively extract cryptographic keys and other secret information from the device. Simple power analysis (SPA) involves visually interpreting power traces, or graphs of electrical activity over time. Differential power analysis (DPA) is a more advanced form of power analysis that can allow an attacker to compute the intermediate values within cryptographic computations by statistically analyzing data collected from multiple cryptographic operations. The attack exploits varying power consumption of microprocessors or other hardware while performing operations using secret keys. DPA attacks have signal processing and error correction properties that can extract secrets from measurements which contain too much noise to be analyzed using simple power analysis.

There are already solutions to prevent side channel attacks, which solutions try to de-correlate the power consumed by the CPU and the information processed by the CPU. Consequently, modern cryptographic solutions often rely on the strength of random numbers used to compute cryptographic keys, e.g., for Diffie-Hellman key agreement protocol. Most present day random numbers are not truly random but rely on pseudo random number generators that are prone to a number of attacks. True random number generators are hard to implement and, in case of FPGAs, require a complex external circuit.

There exist numerous true random number generator (TRNG) implementations and models. "A Design of Reliable True Random Number Generator for Cryptographic Applications", CHES'99, Volume: LNCS 1717, pp 204-218, 1999, Springer-Verlag, proposes to sample analogical white noise after it has been quantized via a comparator. Because of offsets and bandwidth limitations, the generated sequence is typically affected by bias. The bias is eliminated by sending the quantized signal into a binary counter before sampling it, whereas the bit correlation is kept under a fixed value by choosing a suitably low sampling frequency. Therefore, in this kind of generator, defects in the bit statistics are not masked (e.g., via a pseudorandom transformation) but simply suppressed. This can be considered the most correct solution because the device should generate a sequence whose entropy is the maximum possible, not a sequence whose entropy looks like the maximum possible. In a certification testing, one is thus forced to conclude by an analysis of the scheme that, if the output sequence looks random, i.e., if it passes the statistical tests, then it is actually random.

U.S. Pat. No. 8,612,501 B2 discloses a method and hardware for generating random numbers using a dual oscillator architecture within an IC.

WO 2011/126587 A1 discloses a method and an IC for secure encryption and decryption and uses a random number generator that consists of a plurality of XOR gates within the IC.

However, it is not always possible to implement the true random number generator within the IC, e.g. due to the restricted space within the IC.

SUMMARY OF THE INVENTION

In view of the foregoing, one object of the present invention is to provide a true random number generator (TRNG) for an IC, which can also be realized if space for such a generator within the IC is not available.

This and other objects and advantages are achieved in accordance with the present invention by a method for generating true random numbers that includes providing a counter in an integrated circuit, where the counter receives a clock signal of the integrated circuit, sending the signal of a resistor-capacitor circuit, acting as an oscillator, to the counter, where the resistor-capacitor circuit is situated outside the integrated circuit and is connected to the integrated circuit via input/output pins, changing the signal of the resistor-capacitor circuit by randomly switching one or more additional resistors in parallel to the resistor of the resistor-capacitor circuit in order to change the frequency of the signal of the resistor-capacitor circuit, counting the oscillations of the clock during one oscillation of the signal of the resistor-capacitor circuit and filling a register with the resulting bit stream.

The resulting bit stream is then the true random number. In other words, the signal of the resistor-capacitor circuit is used to cause the counter to count up. Each time the resistor-capacitor circuit toggles the counter increments by one unit.

The components of the resistor-capacitor circuit and the additional resistors, which components together form an external electrical circuit, are discrete electric components. Consequently, they cannot be tampered with by using software. Thus, the external electrical circuit is not prone to side channel attacks. And, of course, by using an external electrical circuit for generating true random numbers, such method can also be used for small ICs because most components are situated outside the IC.

In an embodiment of the invention, randomly switching the one or more additional resistors in parallel to the resistor is performed by a pseudo random number generator included in the integrated circuit. As another solution such pseudo random number generator could be included in the external electrical circuit instead.

In another embodiment of the invention, the resulting bit stream is fed to a shift register. Such registers can easily be filled bit-after-bit and are thus most suitable for the method in accordance with the invention.

A statistical test can be used on different bit streams to detect frequency injection attacks and/or changes to the external circuit consisting of the resistor-capacitor circuit and the additional resistors.

It is also an object of the present invention to provide an apparatus for generating true random numbers in accordance with the method of the present invention, where the apparatus includes at least an integrated circuit and an external electrical circuit that is not part of the integrated circuit and that is (detachably or in a fixed manner) connected to the integrated circuit via input/output pins. The integrated circuit includes a pseudo random number generator, and a counter that is configured to run on the system clock of the integrated circuit. The external electrical circuit includes a capacitor connected to the counter and connected to a first input/output pin of the integrated circuit, a resistor connected to the counter and connected to a second input/output pin of the integrated circuit, where the resistor and capacitor form a resistor-capacitor circuit acting as an oscillator, more than one additional resistor, each connected to the counter and via a further input/output pin of the integrated circuit to the pseudo random number generator, which generator is configured to randomly switch one or more additional resistors in parallel to the resistor of the resistor-capacitor circuit in order to change the frequency of the signal of the resistor-capacitor circuit, where the counter is configured to count the oscillations of the clock during one oscillation of the signal of the resistor-capacitor circuit and to fill a register with the resulting bit stream.

The register for the resulting bit stream can be a shift register.

In a preferred embodiment, the integrated circuit includes a statistical unit for using a statistical test on different bit streams to detect frequency injection attacks and/or changes to the external circuit.

Preferably the integrated circuit is implemented as a FPGA.

The proposed solution to generate true random numbers has the benefit of using only a few very cheap external components, i.e., one capacitor and a small number of resistors. The statistical unit additionally helps to mitigate injection attacks or changes to the external circuit. The proposed solution can be applied even to small FPGAs.

The solution is preferably implemented in pure hardware. As a result, there can be no software intervention, so the risk of security attacks is reduced. Still, if desired, some functions can be executed in software, accepting disadvantages with regard to security. Such functions could be: computing entropy or performing checks such as if the external circuit is connected or if the external circuit is running. For these and for other operations the general purpose CPU could be used.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF DRAWINGS

The invention will be explained in closer detail by reference to a preferred embodiment, which is depicted schematically in the figures, in which:

FIG. 1 shows a possible structure for an apparatus in accordance with the invention;

FIG. 2 shows a graphical plot of the voltage at the resistor-capacitor circuit in the apparatus of FIG. 1.

DETAILED DESCRIPTION OF THE EXEMPLARY EMBODIMENTS

Figure 3:
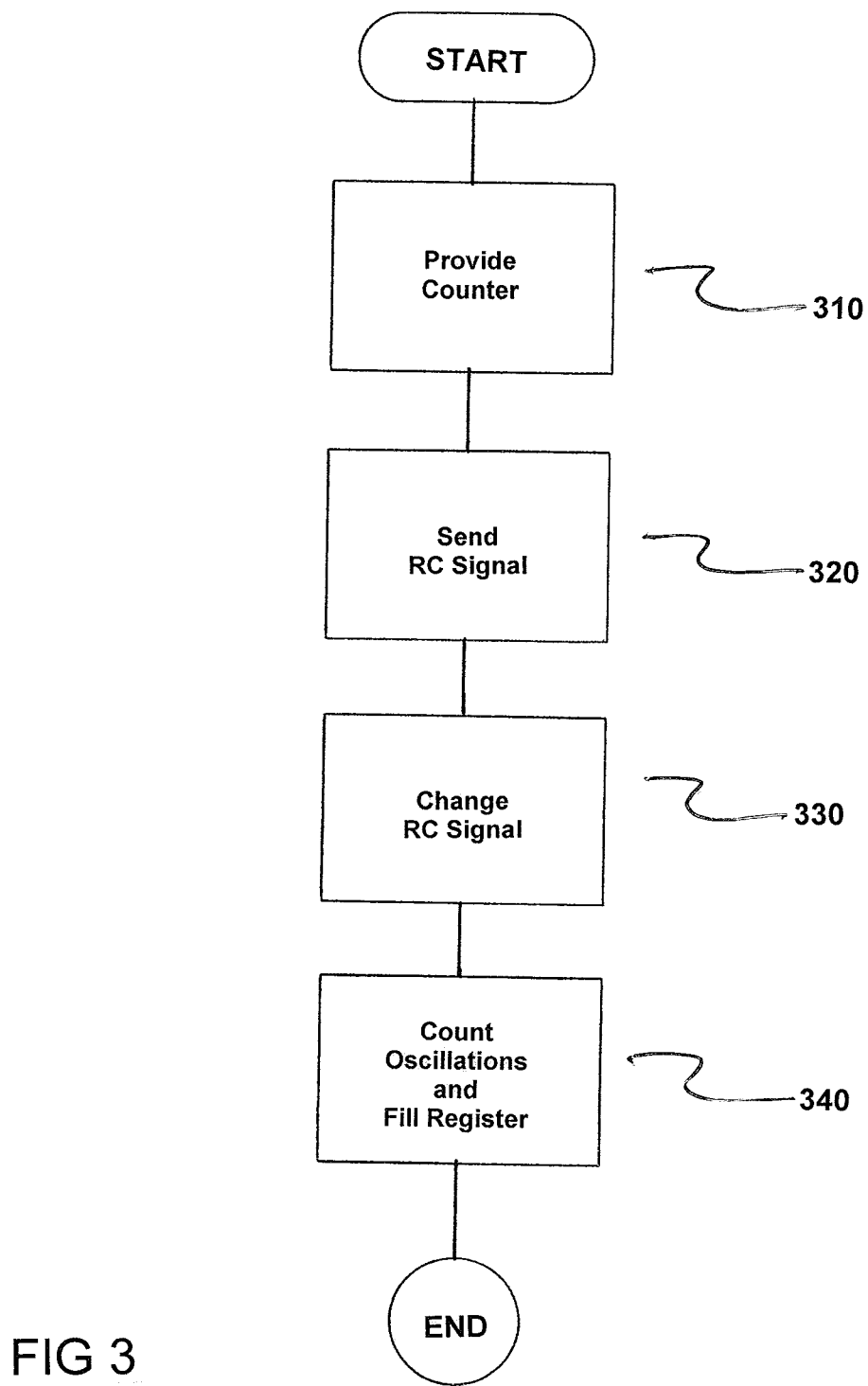
FIG. 3 is a flowchart of the method in accordance with the invention.

FIG. 1 shows a possible structure for a true random number generator, basically consisting of an integrated circuit IC and a very simple external circuit EC that is directly connected to the IC.

The integrated circuit IC includes a statistical unit STU for generating a true random number TRN. Accordingly, the statistical unit STU includes a counter CNT and a pseudo random number generator PRNG. The counter CNT is configured to run on the system clock of the integrated circuit IC. An external electrical circuit EC is connected to the statistical unit STU. The external electrical circuit EC includes a capacitor C connected to the counter CNT via input/output pin GPIOi and connected to the statistical unit STU of the integrated circuit IC via first input/output pin GPIOc, a resistor R connected to the counter CNT via input/output pin GPIOi and connected to the statistical unit STU of the integrated circuit IC via second input/output pin GPIOr, and additional resistors R1, R2, . . . Rn connected to the counter CNT via input/output pin GPIOi, each connected via an own further input/output pin GPIO1, GPIO2, . . . GPIOn to the pseudo random number generator PRNG of the integrated circuit IC.

Seen from the counter CNT, capacitor C and resistor R are connected in parallel, the additional resistor R1, R2, . . . Rn, again being connected in parallel to the resistor R.

The counter CNT is free running and runs on the main system clock, e.g., the clock of the integrated circuit IC, which clock is not correlated to the resistor-capacitor circuit R,C. Accordingly, the frequency of the clock is different from the frequency of the resistor-capacitor circuit R,C acting as an oscillator. Normally, the frequency of the clock is higher than the frequency of the resistor-capacitor circuit R,C.

The resistor R here is connected to ground GND, i.e., either directly to GND or the second input/output pin GPIOr is pulled low. Input/output pin GPIOi is used to "read" the oscillator consisting mainly of the resistor-capacitor circuit R,C and of course including one or more additional resistors R1, R2, . . . Rn. The composition of the set of additional resistors R1, R2, . . . Rn connected in parallel to the resistor R varies over time. The capacitor C is connected to the first input/output pin GPIOc. Input/output pin GPIOc is pulled either high or low, depending on input/output pin GPIOi, i.e., depending on the clock signal.

This can be seen in FIG. 2, where the lower graphical plot shows the output voltage at the input/output pin GPIOi over time t. Vcc (Voltage Common Collector) is the voltage at the common collector, i.e., the positive power supply voltage. The voltage switches between zero and Vcc according to the clock signal, T being the period of the clock signal.

The upper graphical plot shows the voltage signal of the resistor-capacitor circuit R, C. The voltage switches between input voltage high $V_{IH}$ and input voltage low $V_{IL}$ with the same period as the clock signal.

During normal operation, the resistor R is pulled high and capacitor C is pulled high through the first input/output pin GPIOc. When the capacitor C charges above input voltage high $V_{IH}$ the first input/output pin GPIOc yields a logic "1" and the first input/output pin GPIOc is pulled low. The counter CNT is sampled every time the first input/output pin GPIOc toggles. Every sample yields one bit that is shifted into a shift register.

In order to increase entropy, a pseudo random number generator PRNG is used to control the input/output pins GPIO1, GPIO2, . . . GPIOn. These add different resistors R1, R2, . . . Rn in parallel to resistor R therefore changing the output frequency of the oscillator realized through resistor-capacitor circuit R, C. The pseudo random number generator PRNG adds or removes, at every clock cycle or at a random number of clock cycles, one or more resistors R1, R2, . . . Rn. Accordingly, at every clock cycle or at a random number of clock cycles the frequency of the resistor-capacitor circuit R, C would have a different frequency. Consequently, in the upper graphical plot in FIG. 2, the period T would accordingly be longer or shorter.

When the shift register is filled, the statistical unit STU performs an analysis over the random number, analyzing its quality. This can be done, e.g., in accordance with the NIST Special Publication 800-22rev1a "A Statistical Test Suite for Random and Pseudorandom Number Generators for Cryptographic Applications". The statistical unit STU will analyze and compare more than one sample to detect frequency injection attacks and/or changes to the external circuit EC.

The integrated circuit IC can be any solution applied to verify and control the random number generator, such as a microcontroller, a FPGA, an ASIC or the like. In the current example the IC is considered to be a FPGA device.

FIG. 3 is a flowchart of the method for generating true random numbers for an integrated circuit IC. The method comprises providing a counter CNT in an integrated circuit IC, as indicated in step 310. In accordance with the invention, the counter receives a clock signal of the integrated circuit IC.

Next, a signal of a resistor-capacitor circuit R, C functioning as an oscillator is sent to the counter CNT, as indicated in step 320. In accordance with the invention, the resistor-capacitor circuit R, C is situated outside the integrated circuit IC and is connected to the integrated circuit IC via input/output pins.

Next, the signal of the resistor-capacitor circuit R, C is changed by randomly switching at least one additional resistor R1, R2, . . . Rn in parallel to the resistor R of the resistor-capacitor circuit to change the frequency of the signal of the resistor-capacitor circuit R, C, as indicated in step 330.

Next, oscillations of the clock signal are counted during one oscillation of the signal of the resistor-capacitor circuit R, C and a register is filled with the resulting bit stream, as indicated in step 340.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for generating true random numbers for an integrated circuit, the method comprising:
   providing a counter in an integrated circuit, said counter receiving a clock signal of the integrated circuit;
   sending a signal of a resistor-capacitor circuit functioning as an oscillator to the counter, the resistor-capacitor circuit being situated outside the integrated circuit and being connected to the integrated circuit via input/output pins;
   changing the signal of the resistor-capacitor circuit by randomly switching at least one additional resistor in parallel to the resistor of the resistor-capacitor circuit to change the frequency of the signal of the resistor-capacitor circuit; and
   counting oscillations of the clock signal during one oscillation of the signal of the resistor-capacitor circuit and filling a register with a resulting bit stream.

2. The method according to claim 1, wherein randomly switching the at least one additional resistor in parallel to the resistor is performed by a pseudo random number generator included in the integrated circuit.

3. The method according to claim 1, wherein the resulting bit stream is fed to a shift register.

4. The method according to claim 2, wherein the resulting bit stream is fed to a shift register.

5. The method according to claim 1, wherein a statistical test is utilized on the resulting bit stream to detect at least one of (i) frequency injection attacks and (ii) changes to external circuit consisting of the resistor-capacitor circuit and the at least one additional resistor.

6. An apparatus for generating true random numbers, comprising:
   at least an integrated circuit; and
   an external electrical circuit which is not part of the integrated circuit and which is connected to the integrated circuit via input/output pins;
   wherein the integrated circuit includes:
      a pseudo random number generator, and
      a counter configured to run on a system clock of the integrated circuit;
   wherein the external electrical circuit includes:

a capacitor connected to the counter and connected to a first input/output pin of the integrated circuit, a resistor connected to the counter and connected to a second input/output pin of the integrated circuit, said resistor and capacitor forming a resistor-capacitor circuit functioning as an oscillator, and at least two additional resistors, each of said at least two additional resistor being connected to the counter and via a further input/output pin of the integrated circuit to the pseudo random number generator, said pseudo random number generator being configured to randomly switch at least one resistor of the at least two additional resistors in parallel to the resistor of the resistor-capacitor circuit to change a frequency of a signal of the resistor-capacitor circuit, and the counter being configured to count oscillations of the system clock during one oscillation of the signal of the resistor-capacitor circuit and to fill a register with a resulting bit stream.

7. The apparatus according to claim 6, wherein the register for the resulting bit stream comprises a shift register.

8. The apparatus according to claim 6, wherein the integrated circuit is further configured to utilize a statistical test on the resulting bit stream to detect at least one of (i) frequency injection attacks and (ii) changes to the external circuit.

9. The apparatus according to claim 8, wherein the integrated circuit is further configured to utilize a statistical test on the resulting bit stream to detect at least one of (i) frequency injection attacks and (ii) changes to the external circuit.

10. That apparatus according to claim 6, wherein the integrated circuit is implemented as a field-programmable gate array (FPGA).

11. The apparatus according to claim 8, wherein the integrated circuit is implemented as a field-programmable gate array (FPGA).

12. The apparatus according to claim 10, wherein the integrated circuit is implemented as a field-programmable gate array (FPGA).

* * * * *